(12) United States Patent
Menke et al.

(10) Patent No.: US 10,384,875 B2
(45) Date of Patent: Aug. 20, 2019

(54) CONVEYOR SYSTEM, MODULAR CONVEYOR CHAIN AND INJECTION MOLDED PLASTIC CHAIN MODULE

(71) Applicant: REXNORD FLATTOP EUROPE B.V., 's-Gravenzande (NL)

(72) Inventors: Cornelis Hendrik Mijndert Menke, 's-Gravenzande (NL); Remco van der Ende, 's-Gravenzande (NL)

(73) Assignee: REXNORD FLATTOP EUROPE B.V., S-Gravenzande (NL)

( * ) Notice: Subject to any disclaimer, the term of this patent is extended or adjusted under 35 U.S.C. 154(b) by 0 days.

(21) Appl. No.: 15/772,209

(22) PCT Filed: Oct. 28, 2016

(86) PCT No.: PCT/NL2016/050753
§ 371 (c)(1),
(2) Date: Apr. 30, 2018

(87) PCT Pub. No.: WO2017/074192
PCT Pub. Date: May 4, 2017

(65) Prior Publication Data
US 2018/0312339 A1 Nov. 1, 2018

(30) Foreign Application Priority Data

Oct. 30, 2015 (NL) ..................................... 2015697

(51) Int. Cl.
*B65G 17/06* (2006.01)
*B65G 17/08* (2006.01)
*B65G 17/40* (2006.01)

(52) U.S. Cl.
CPC ............. *B65G 17/08* (2013.01); *B65G 17/06* (2013.01); *B65G 17/086* (2013.01); *B65G 17/40* (2013.01)

(58) Field of Classification Search
CPC ...... B65G 17/06; B65G 17/08; B65G 17/065; B65G 17/066
(Continued)

(56) References Cited

U.S. PATENT DOCUMENTS 4,729,469 A * 3/1988 Lapeyre ................. B65G 17/08
198/834
4,880,107 A 11/1989 Deal
(Continued)

OTHER PUBLICATIONS

International Search Report and Written Opinion dated Feb. 20, 2017 in connection with PCT/NL2016/050753.

*Primary Examiner* — James R Bidwell
(74) *Attorney, Agent, or Firm* — Quarles & Brady LLP (57) ABSTRACT

An injection molded plastic chain module comprising a substantially elongate conveying body and a hinge structure located at a bottom side of the module for hingedly connecting a front and a rear side of the module with adjacent modules. The conveying body comprises two wing shaped portions extending laterally away from the hinge structure, and comprising a respective top plate portion that defines a part of a supporting surface for supporting products to be transported, wherein each of said top plate portions has a thickness of less than ⅓ of the total thickness of the respective wing shaped portion. Further, each wing shaped portion comprises one or more downwardly extending supporting wall portions for supporting the respective top plate portion. The module may merely consist of a plurality of relatively thin plate and/or wall portions, preferably all having a substantially equal thickness.

19 Claims, 6 Drawing Sheets

(58) Field of Classification Search
 USPC .................................................. 198/850, 853
 See application file for complete search history.

(56) References Cited

U.S. PATENT DOCUMENTS

| | | | | |
|---|---|---|---|---|
| 5,439,099 | A * | 8/1995 | Bos ........................ | B65G 17/08 198/853 |
| 6,564,933 | B2 * | 5/2003 | Morimoto .............. | B65G 17/08 198/850 |
| D486,289 | S | 2/2004 | Abbestam | |
| 7,331,446 | B2 * | 2/2008 | Verduijn .............. | B65G 17/385 198/805 |
| 7,367,448 | B2 * | 5/2008 | Fandella .............. | B65G 17/086 198/853 |
| 2006/0191774 | A1 * | 8/2006 | Verduijn .............. | B65G 17/385 198/852 |
| 2007/0034485 | A1 * | 2/2007 | Fandella ................ | B65G 17/08 198/851 |
| 2008/0017482 | A1 | 1/2008 | Fandella | |

* cited by examiner

CONVEYOR SYSTEM, MODULAR CONVEYOR CHAIN AND INJECTION MOLDED PLASTIC CHAIN MODULE

CROSS-REFERENCE TO RELATED APPLICATIONS

This application represents the national stage entry of PCT International Application No. PCT/NL2016/050753 filed Oct. 28, 2016 and claims priority to Netherlands Patent Application No. NL 2015697 filed Oct. 30, 2015. The contents of these applications are hereby incorporated by reference as if set forth in their entirety herein.

STATEMENT REGARDING FEDERALLY SPONSORED RESEARCH OR DEVELOPMENT

Not applicable.

TECHNICAL FIELD AND BACKGROUND

The invention relates to a conveyor system comprising a conveyor chain having injection molded plastic chain modules. Such conveyor systems, such conveyor chains and such injection molded plastic chain modules are known and are utilized to form conveyor chains for conveying all sorts of products.

SUMMARY

The conveyor chain can comprise injection molded plastic chain modules, each of which comprise a substantially elongate conveying body defining a supporting surface for supporting products to be transported on said conveying body, and a hinge structure for hingedly connecting the plastic chain module with other modules, wherein the hinge structure is located at a lower side of the plastic chain module and comprises a first hinge structure portion defining a first hinge pin receiving space for receiving a hinge pin, wherein the hinge structure further comprises a second and a third hinge structure portion defining a second hinge pin receiving space and a third hinge pin receiving space, respectively, wherein said second and third hinge structure portions are interspaced to receive a first hinge structure portion of a consecutive chain module there between, wherein the substantially elongate conveying body comprises a central portion and two wing shaped portions substantially extending away from said central portion in respective lateral directions, bottom sides of said wing shaped portions being arranged to be supported by a guide track.

Further, the conveyor system may for instance also comprise a conveyor mat having a relatively large width with respect to the conveyor chain. A top run of the conveyor chain, which chain can have a relatively small width with respect to a conveyor mat, can at least partly extend along a top run of a conveyor mat located at least partly substantially parallel to the top run of the chain. For instance by means of a transfer guide rail, products conveyed by the conveyor mat can be transferred to the conveyor chain or vice versa.

In the conveyor system, the wing shaped portions of the substantially elongate conveying body of the injection molded plastic chain modules can be supported by a guide track, especially by wear strips or rails thereof. The top run of the conveyor mat can be supported by the same guide track or by a guide track having a top surface located substantially at the same height level as the height level of the guide track supporting the wing shaped portions of the chain modules.

In order to facilitate the transfer of products from the conveyor mat to the conveyor chain, a respective part of a supporting surface of the conveyor chain formed by the supporting surfaces of interconnected chain modules of said chain can preferably be located at the same height level as a corresponding adjacent part of the supporting surface of the conveyor mat. Therefore, the height of the wing shaped portions of the conveyor chain modules is often substantially equal to the height of the conveyor mat modules and/or to the height of a substantially elongate conveying body of conveyor mat modules of said mat.

Since conveyor mats usually have their hinge pins located in the substantially elongate conveying body of conveyor mat modules of said mat, said conveying bodies of said mats need a certain height, for instance a height between 4 mm and 35 mm, such as for instance about 8.7 mm or about 12.7 mm. Hence, the wing shaped portions of the conveyor chain modules often have corresponding heights, e.g. a height between 3 mm and 40 mm, preferably a height in a range ranging from 4 mm to 35 mm, such as for instance a height of about 4 mm, about 8.7 mm, or about 12.7 mm. As a result of such relatively thick wing shaped portions of the injection molded plastic chain modules, injection molding such plastic chain modules takes a lot of time due to long cooling times.

It is an object of the invention to provide an alternative conveyor system. In particular, it can be an object of the invention to provide a conveyor in which at least one of the disadvantages of the prior art conveyor systems is counteracted. More in particular, the invention may aim to provide a conveyor system, which on the one hand can facilitate a relatively smooth transfer of products from a supporting surface of a conveyor mat of said system onto an adjacently located supporting surface of a conveyor chain of said system, or vice versa, whereas said conveyor system can on the other hand be produced in a relatively time and/or cost efficient manner, especially with respect to conventional conveyor systems having injection molded plastic chain modules with relatively thick plastic wing shaped portions having a thickness corresponding to the thickness of substantially elongate conveying bodies of conveyor mat modules of the conveyor mat of the conveyor system.

Thereto, the invention provides for a conveyor system comprising a modular conveyor chain having a plurality of injection molded plastic chain modules, wherein each of said injection molded plastic chain modules comprises a substantially elongate conveying body defining a supporting surface for supporting products to be transported on said conveying body, and a hinge structure for hingedly connecting the plastic chain module with other modules, wherein the hinge structure is located at a lower side of the plastic chain module, wherein the hinge structure comprises a first hinge structure portion, especially a hinge structure front portion located at the leading side of the module, which first hinge structure portion defines a first hinge pin receiving space for receiving a hinge pin, wherein the hinge structure further comprises a second hinge structure portion and a third hinge structure portion, especially two hinge structure rear portions located at the trailing side of the module, wherein said second and third hinge structure portions define a second hinge pin receiving space and a third hinge pin receiving space, respectively, wherein said second and third hinge structure portions are interspaced to receive a first hinge structure portion, especially a hinge structure front portion, of a consecutive chain module there between, wherein the substantially elongate conveying body comprises a central portion, wherein the substantially elongate conveying body further comprises two wing shaped portions substantially extending away from said central portion in a respective lateral direction, wherein bottom sides of said wing shaped portions are arranged to be supported by a guide track, wherein each of both wing shaped portions comprises a respective top plate portion defining a part of the supporting surface for supporting products to be transported, each of said top plate portions having a thickness being less than ⅓ of the thickness of the respective wing shaped portion, and wherein each wing shaped portion further comprises one or more supporting wall portions for supporting the respective top plate portion, wherein the supporting wall portions extend substantially downwards from the respective top plate portion.

In short, in advantageous embodiments, the invention can relate to an injection molded plastic chain module comprising a substantially elongate conveying body and a hinge structure located at a bottom side of the module for hingedly connecting a front and a rear side of the module with adjacent modules. The conveying body comprises two wing shaped portions extending laterally away from the hinge structure, and comprising a respective top plate portion that defines a part of a supporting surface for supporting products to be transported, wherein each of said top plate portions has a thickness of less than ⅓ of the total thickness of the respective wing shaped portion. Further, each wing shaped portion comprises one or more downwardly extending supporting wall portions for supporting the respective top plate portion. Each wing shaped portion may thus comprise a multiple number of downwardly extending supporting wall portions. In embodiments, the module may merely consist of a plurality of relatively thin plate and/or wall portions, preferably all having a substantially equal thickness. It is noted that the term "relatively thin" in the context of said relatively thin plate portions and/or relatively thin wall portions, at least in embodiments, may be understood as meaning that substantially all of said plate and/or wall portions substantially have a thickness that is relatively thin with respect to the height or total thickness of the wing shaped portions of the substantially elongate conveying body of the chain module. For example, in embodiments, substantially all of said relatively thin plate portions and/or relatively thin wall portions may substantially have a respective thickness being less than ⅓ of the thickness of the wing shaped portions, and preferably even may substantially have a respective thickness being at most 30%, at most 25%, or at most 20% of said wing shaped portion thickness. Additionally or alternatively, the term "relatively thin" in the context of said relatively thin plate portions and/or relatively thin wall portions may, at least in embodiments, be understood as meaning that substantially all of said relatively thin plate portions and/or relatively thin wall portions have a thickness that is relatively thin with respect to the width of the second hinge structure portion and/or the width of the third hinge structure portion, said respective hinge structure portion's width in particular being measured in the lateral direction of the chain module. For example, in embodiments, substantially all of said relatively thin plate portions and/or relatively thin wall portions may substantially have a respective thickness being less than 40%, less than 35% or less than 30% of the width of the second hinge structure portion and/or of the width of the third hinge structure portion.

By providing the substantially downwardly extending supporting wall portions, the wing shaped portion of the conveying body can have a relatively large thickness, e.g. about 4, 8.7 or 12.7 mm, without the need of the top plate portion of said wing shaped portion to have such a relatively large thickness itself. By not forming the wing shaped portion of the conveying body as substantially massive plastic module portions, not only the cooling time, and therefore the complete cycle time, of the injection molding can be relatively short, but also relatively little plastic material is needed. Hence, the injection molded plastic chain modules, and therefore the conveyor chain and the conveyor system as well, can be produced in a relatively time efficient and cost efficient manner.

Advantageously, the injection molded plastic chain module can be an integrally molded chain module. The chain module may thus be formed as single piece, and then thus not being assembled from multiple separately formed pieces.

In embodiments, the supporting wall portions of a respective wing portion can comprise multiple, preferably substantially parallel, supporting wall portions that are interspaced with respect to each other such that an interspace between two adjacent, preferably substantially parallel, wall portions is wider than the thickness of each of said two wall portions. For example, the width of the interspace can be at least 150%, preferably at least 200% or even more, of the thickness of the thickest of said two adjacent wall portions. It is noted that both of said two interspaced wall portions preferably may have the same thickness as the other one.

By providing relatively wide interspaces between supporting wall portions for supporting the respective top plate portion, relatively plenty of empty space can be provided within the wing shaped portions, which empty space is free of plastic material.

Advantageously, the wing shaped portions can be formed as substantially hollow wing shaped portions. This is, for instance more than 50%, preferably more than 60%, such as for instance at least 70%, of the total volume of the wing shaped portion may be formed by one or more empty spaces, whereas less than 50%, preferably less than 40%, such as for instance at most 30%, of the total volume of the wing shaped portion is formed by plastic material.

According to another aspect, the wing shaped portion can substantially consist of a plurality of relatively thin plate and/or wall portions. Advantageously, all of said plate portions and/or wall portions can have substantially the same thickness.

In preferred embodiments, the whole injection molded plastic chain module can substantially consist of a plurality of relatively thin plate and/or wall portions, preferably all having a substantially equal thickness.

In the context of this application it is noted that "having substantially the same thickness" and/or "having a substantially equal thickness" may at least be considered as meaning that the thickness of the plate and/or wall portions differ from each other to such a small extent that the thickness of the thickest plate or wall portion is less than 250%, preferably less than 200% or less than 150%, more preferably less than 120%, even more preferably less than 115%, such as for instance at most 110% or 105%, of the thickness of the thinnest plate and/or wall portion.

By arranging at least the wing shaped portions of the module such that all their portions or parts have substantially equal thicknesses, and advantageously by arranging substantially the whole chain module such that substantially all its portions or parts are of substantially equal wall thickness, the cooling time can be relatively short, as a result of which the injection molded plastic chain module can be ejected from its mold relatively quickly, thereby contributing to a relatively short injection molding cycle time.

It is noted that the present invention also relates to a conveyor chain for transporting products.

Further, the invention relates to an injection molded plastic chain module comprising a substantially elongate conveying body having wing shaped portions that each have a respective top plate portion defining a part of a supporting surface for supporting products to be transported, each of said top plate portions having a thickness being less than ⅓ of the thickness of the respective wing shaped portion, and wherein each wing shaped portion further comprises one or more supporting wall portions for supporting the respective top plate portion, wherein the supporting wall portions extend substantially downwards from the respective top plate portion.

Advantageous embodiments according to the invention are described in the appended claims.

BRIEF DESCRIPTION OF DRAWINGS

By way of non-limiting examples only, embodiments of the present invention will now be described with reference to the accompanying figures in which.

It is noted that the figures show merely preferred embodiments according to the invention. In the figures, the same or similar reference signs or numbers refer to equal or corresponding parts.

DESCRIPTION OF EMBODIMENTS

Figure 1:
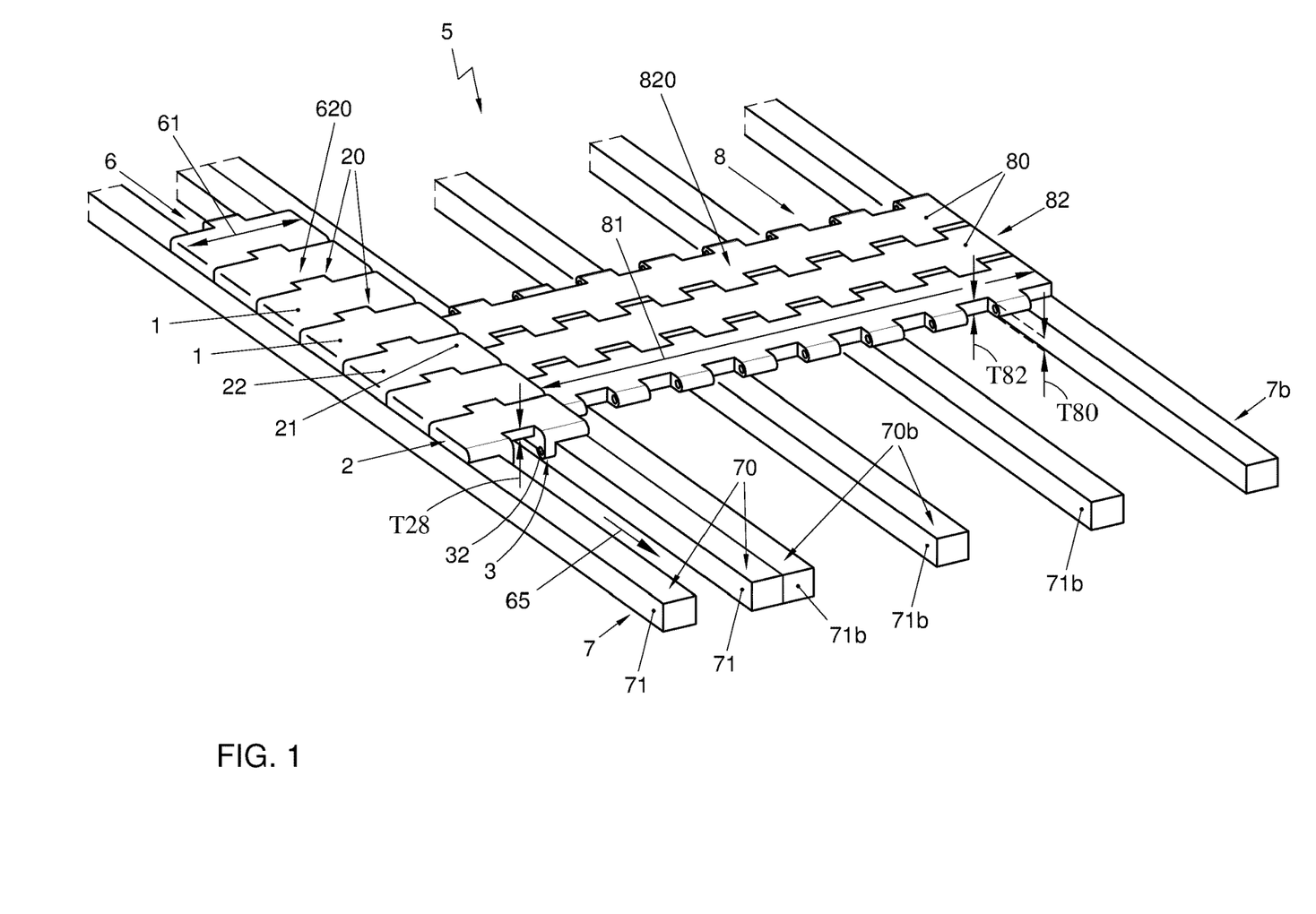
FIG. 1 shows a schematic perspective partly cut away view of an embodiment of a conveyor system according to an aspect of the invention.

FIG. 1 shows a schematic perspective partly cut away view of an embodiment of a conveyor system 5 according to an aspect of the invention. The conveyor system 5 comprises a modular conveyor chain 6, which comprises multiple injection molded plastic conveyor chain modules 1 interconnected by hinge pins 100 (see FIG. 3). During use, a top run of the chain 6 traverses a guide track 7. Wing shape portions 21, 22 of the modules 1, especially bottom sides thereof 25, 26, may be supported on a top surface 70 of said guide track 7. For instance, said top surface 70 or a so-called guide surface 70, especially a substantially horizontally oriented top surface, of the guide track 7 may be formed by at least two elongated guides 71 of the guide track 7. Said two elongated guides 71 can for instance be or comprise a pair of interspaced wear strips or rails 71, which preferably are substantially equispaced apart along their lengths.

A hinge structure 3 of the module can be located at a lower side 10 of the plastic chain module 1, e.g. a side located opposite of a top surface which may define a supporting surface 20 for supporting products to be conveyed during at least a part of a top run of the conveyor chain 6. The hinge structure 3, which can be extending downwardly from a substantially elongate conveying body 2, can be located at least partly between said two elongated guides 71 and can for instance be arranged to prevent lateral movement of the modules 1 and/or the chain 6.

In embodiments, the conveyor system 5 can comprise a conveyor mat 8, which for instance can comprise multiple interconnected conveyor mat modules 80. The modules 80 of the conveyor mat 8 may have a relatively large width 81 with respect to the width 61 of the conveyor chain 6.

A top run of the conveyor chain 6 can at least partly extend along a top run of the conveyor mat 8 located at least partly substantially parallel to the top run of the chain. This may for instance be done to allow products transported by the mat 8 to be transferred to the chain 6 or vice versa. For example, the chain 6 may move at a higher speed that the mat 8.

Additionally or alternatively, the conveyor chain 6, which advantageously can be a side-flexing conveyor chain designed to convey products along a track having one or more arcuate sections, may be arranged to move products in a direction away from the conveyor mat 8.

The conveyor system 5 may comprise track means 7b or guide means 7b, e.g. comprising a table, to guide and/or support a top run of the conveyor mat 8. A top surface or a so-called guide surface 70b, especially a substantially horizontally oriented top surface 70b, may be formed by any suitable means, e.g. at least partly by multiple elongated guides 71b and/or top surfaces thereof. It is noted that a said track or guide means 7b for supporting and/or guiding a top run of the mat 8 may for instance at least partly be integrated with the track or guide means 7 for supporting and/or guiding the conveyor chain 6.

In embodiments, the guide or top surface 70b on which the mat 8 travels and the guide or top surface 70 on which the chain 6 travels can be located at the same height level.

Especially then, for example in order to facilitate the transfer of products from the conveyor mat 8 to the conveyor chain 6 or vice versa, a respective part of a supporting surface 620 of the conveyor chain 6 formed by the supporting surfaces 20 of interconnected chain modules 1 of said chain 6 can preferably be located at the same height level as a corresponding adjacent part of the supporting surface 820 of the conveyor mat 8. Preferably, the height T21, T22 of the wing shaped portions 21, 22 of the conveyor chain modules 1 can be substantially equal to a height T80 of the conveyor mat modules 80 and/or to the height T82 of a substantially elongate conveying body 82 of conveyor mat modules 80 of said mat 8.

Figure 2:
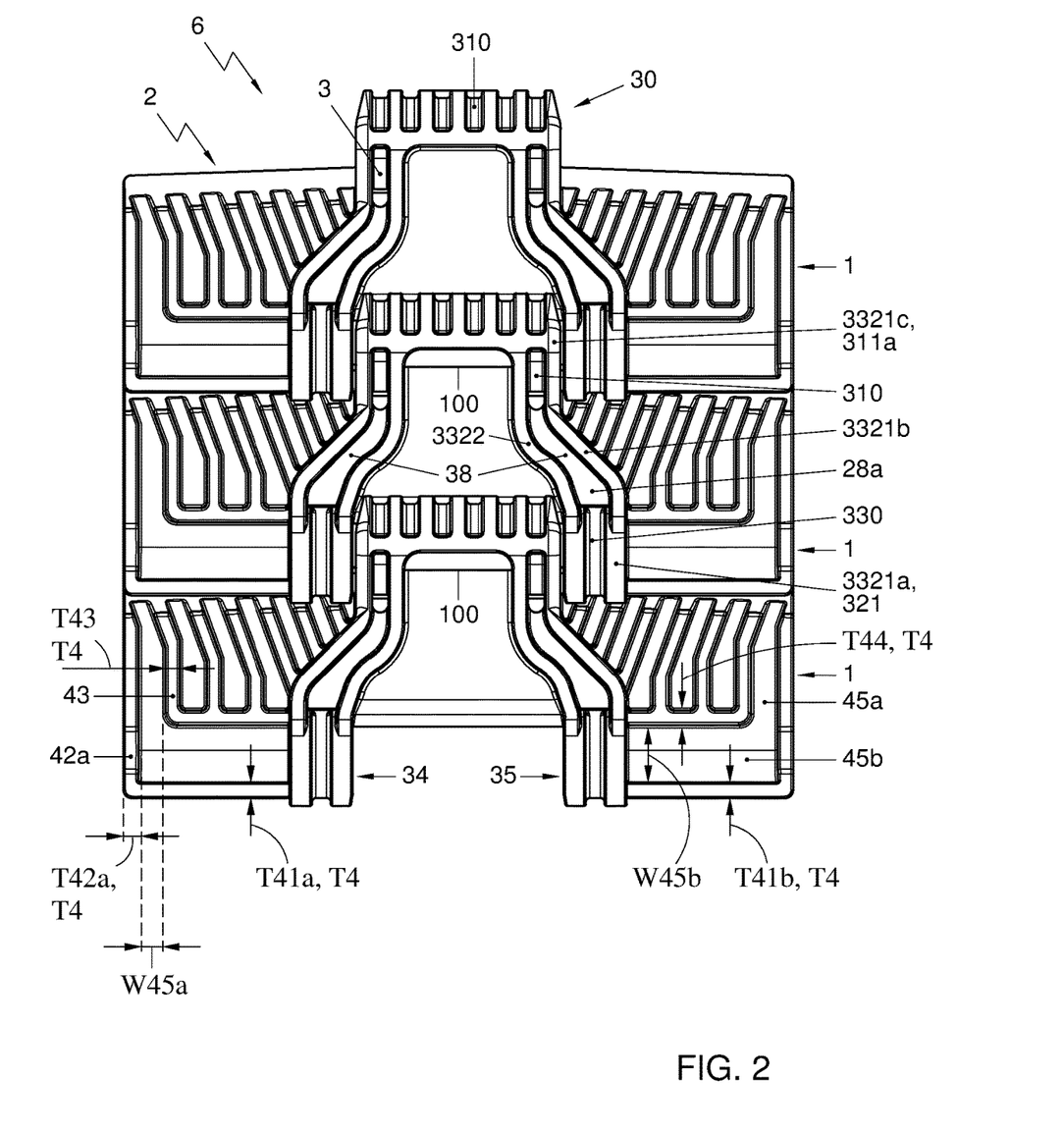
FIG. 2 shows a schematic perspective bottom view of an embodiment of a modular conveyor chain according to an aspect of the invention.
Figure 3:
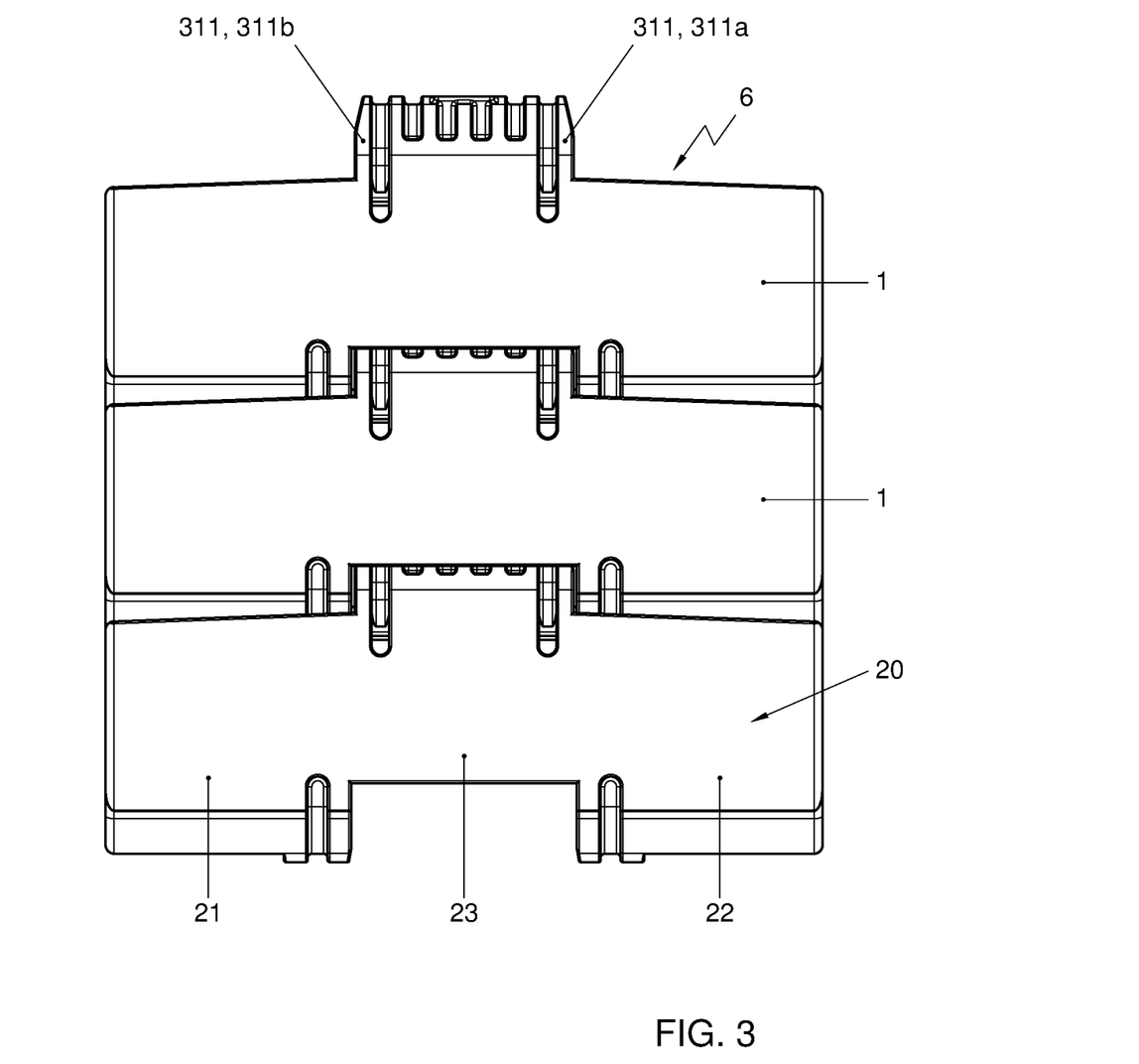
FIG. 3 shows a schematic perspective top view of an embodiment of the modular conveyor chain of FIG. 2.

The modular conveyor chain 6 and the modules 1 can be seen in more detail in FIGS. 2 and 3.

Figure 4:
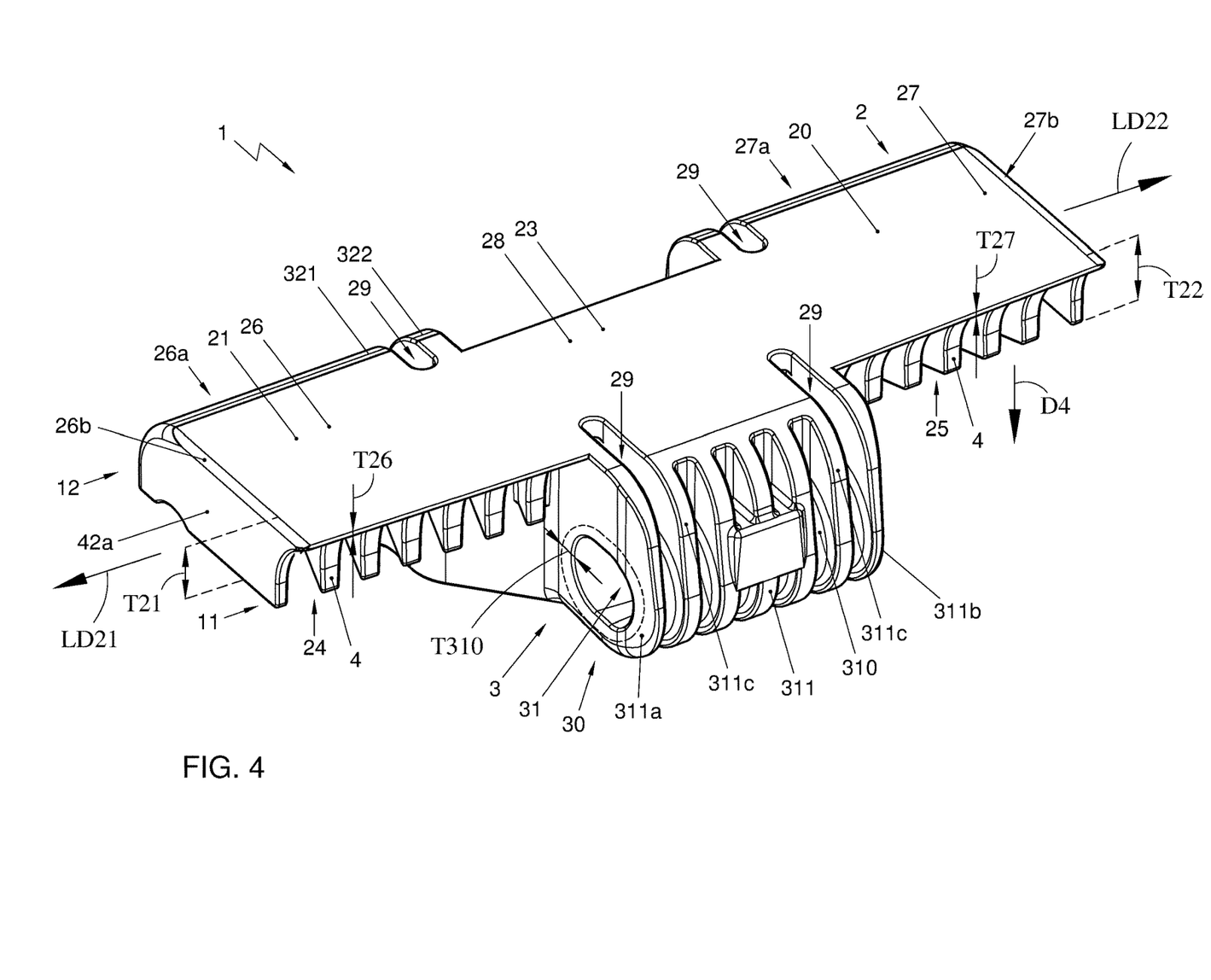
FIG. 4 shows a schematic perspective view of an embodiment of an injection molded plastic chain module according to an aspect of the invention.
Figure 5:
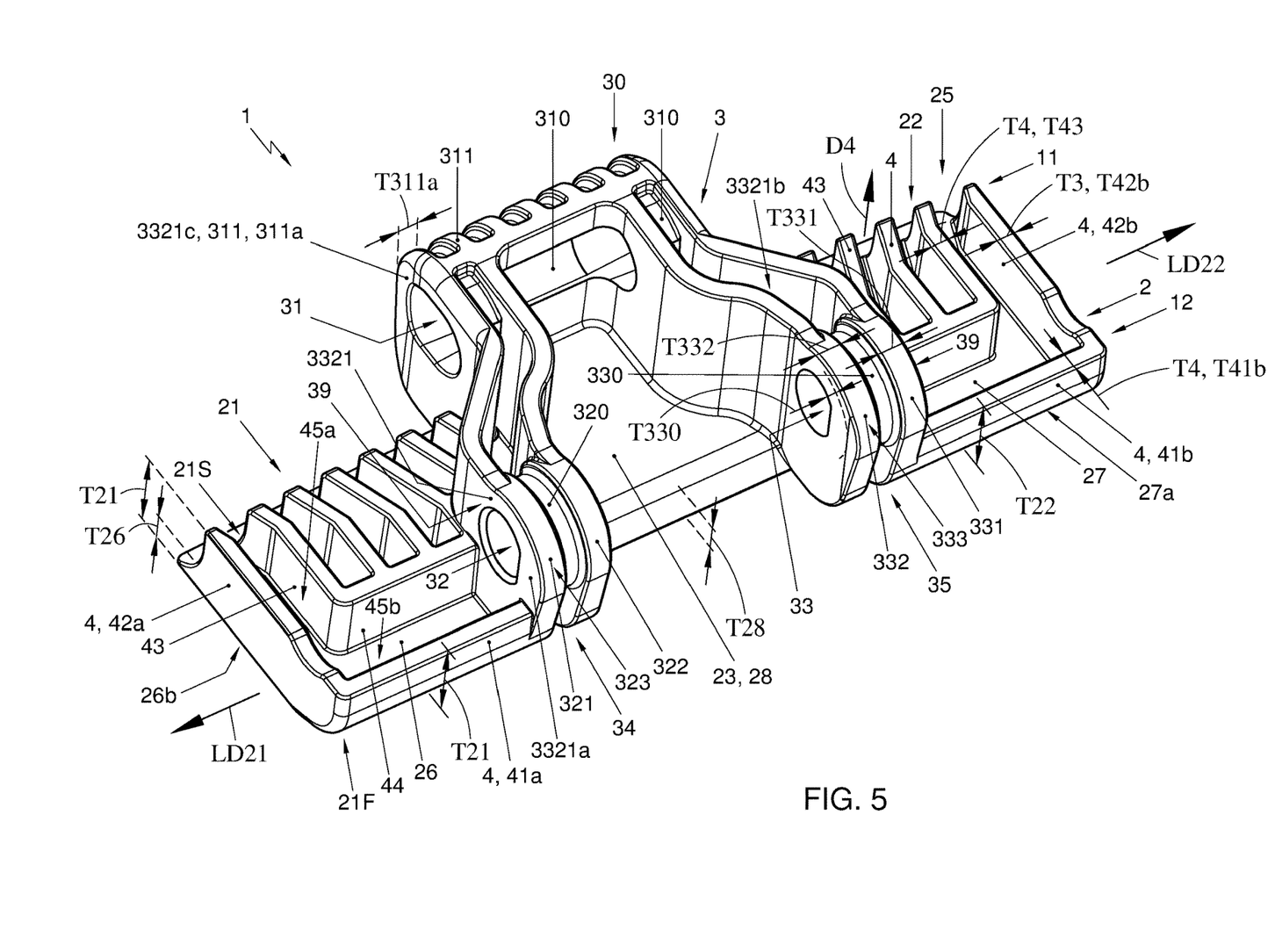
FIG. 5 shows a schematic perspective view of module of FIG. 4 when turned upside-down.

As can be seen in for instance FIGS. 4 and 5, the injection molded plastic chain module 1, which is for a modular conveyor chain 6, comprises a substantially elongate conveying body 2 defining a supporting surface 20 for supporting products to be transported on said conveying body 2.

The module 1 also comprises a hinge structure 3 for hingedly connecting the plastic chain module 1 with other chain modules 1. Said hinge structure 3 is located at a lower side 10 of the plastic chain module 1, and may preferably extend downwardly from the conveying body 2. The hinge structure 3 may extend downwards beyond the bottom sides of the wing shaped portions 21, 22. For example, the hinge structure 3 may extend downwards beyond the bottom side(s) of one or more supporting wall portion(s) 4 that is/are part of the respective wing shaped portion(s) 21, 22. In preferred embodiments, the supporting wall portion(s) 4 may thus extend less far downwards from a top side of the chain module than the hinge structure 3 is extending downwards.

Outer side surfaces 39 of a downwardly extending hinge structure may for instance form guiding surfaces 39 to be guided by, e.g. side surfaces of, track or guide means 7 for supporting and/or guiding the conveyor chain 6 during use.

The hinge structure 3 comprises a first hinge structure portion 30, preferably a hinge structure front portion located at the leading side 11 of the module 1, which first hinge structure portion 30 defines a first hinge pin receiving space 31 for receiving a hinge pin. The hinge structure 3 further comprises a second hinge structure portion 34 and a third hinge structure portion 35. Preferably, said second and third hinge structure portions 34, 35 are formed as hinge structure rear portions located at the trailing side 12 of the module 1. Said second and third hinge structure portions 34, 35 define a second hinge pin receiving space 32 and a third hinge pin receiving space 33, respectively. Further, said second and third hinge structure portions 34, 35 are interspaced, e.g. in the width direction of the module 1, to receive a first hinge structure portion 30, especially a hinge structure front portion, of a consecutive chain module 1 there between. This may be done in such manner that the second hinge pin receiving space 32, the first hinge pin receiving space 31, and the third hinge pin receiving space 33 are substantially aligned to jointly receive a first hinge pin 100.

As the injection molded plastic module 1 can be a chain module 1 and not a belt module, the width of the module 1 can be relatively small, for instance said width not being more than five, more than four, more than three or more than two times larger than the length of the module measured in the conveying direction and/or than the height of the module.

Additionally or alternatively, the width of the hinge structure 3 can be relatively small with respect to width of the module 1, for instance such that the total width of the module 1 is at least 50%, at least 60%, at least 80%, or even at least 100% larger than the width of the hinge structure 3.

As the injection molded plastic module 1 is a chain module 1 which is relatively small with respect to a belt module, the hinge structure 3 of the module 1 can be arranged such that when two of such modules 1 are interconnected, only a single first hinge structure portion 30 of a first module 1 is located between two interspaced hinge structure portions 34, 35 of a successive module 1. Then no additional first hinge structure portion of the first module 1 is located at a laterally outwardly facing side of the second hinge structure portion 34 of the further module and also no additional first hinge structure portion of the first module is then located at a laterally outwardly facing side of the third hinge structure portion 35. Advantageously, the module may comprise a single first hinge structure portion 30 (and may then thus be free of any further first hinge structure portions). Additionally or alternatively, the module 1 may comprise a single second hinge structure portion 34 (and no further second hinge structure portions) and a single third hinge structure portion 35 (and no further third hinge structure portions).

The substantially elongate conveying body 2 of the chain module 1 comprises a central portion 23, which, seen in a widthwise direction of the module 1, may substantially extend from the second hinge structure portion 34 to the third hinge structure portion 35. Further, the substantially elongate conveying body further 2 comprises two wing shaped portions 21, 22 that substantially extend away from said central portion 23 in a respective lateral direction LD21, LD22.

Bottom sides 24, 25 of said wing shaped portions 21, 22 are arranged to be supported by a guide track 7, for instance by a top surface 70 or a so-called guide surface 70, especially a substantially horizontally oriented top surface 70, of said guide track 7 and/or of one or more respective ones of multiple elongated guides 71 of said guide track 7.

Each of both wing shaped portions 21, 22 comprises a respective top plate portion 26, 27 defining a part of the supporting surface 20 for supporting products to be transported. It is noted that the central portion 23 may additionally also form a part of the supporting surface 20. Preferably, the supporting surface 20 and or the top plate portions 26, 27 may be substantially planar.

It is noted that each of said top plate portions 26, 27 has a thickness T26, T27, which can be measured in a direction substantially transverse to the conveying direction 65 and substantially transverse to the width direction of the chain module 1, being less than ⅓ of the total thickness T21, T22 of the respective wing shaped portion 21, 22, which also can be measured in a direction substantially transverse to the conveying direction 65 and substantially transverse to the width direction of the chain module 1.

Preferably, the thickness of the thickness T26, T27 of the top plate portion 26, 27 can be less than 25%, less than 20%, or even less than 15% or less than 10%, of the total thickness T21, T22 of the wing shaped portion 21, 22. In embodiments, the thickness or so-called height T21, T22 of the wing shaped portion can be between 3 mm and 40 mm, preferably in a range from 4 mm to 35 mm, such as for instance a height of about 4 mm, about 8.7 mm, or about 12.7 mm, whereas the thickness T26, T27 of the top plate portion 26, 27 can for instance be between 0.5 and 4 mm, preferably between 1.5 mm and 2.5 mm, such as for instance about 1.5, 1.8, or 2.0 mm.

Besides, each wing shaped portion 21, 22 further comprises one or more supporting wall portions 4 for supporting the respective top plate portion 26, 27, wherein the supporting wall portions 4 extend substantially downwards D4 from the respective top plate portion 26, 27. It is noted that although the supporting wall portions 4 may extend substantially transversely to the top plate portion 26, 27, said supporting wall portions 4 may alternatively extend in another direction. For example, they can be slanted to some extent.

It is noted that the top plate portion 26, 27, especially a rear end thereof, may extend beyond the supporting walls portions 4 supporting it. This can for instance be seen in FIGS. 4 and 5. The top plate portion may thus overhang the walls portions 4, for instance in order to provide space 21S for accommodating a front portion 21F, preferably a rounded off front portion 21F, of a wing shaped portion 21, 22 of an adjacent chain module 1 at least partly.

Further, it is noted that the central portion 23 of the substantially elongate conveying body 2 may comprise a top plate portion 28 defining a part of the supporting surface 20 for supporting products to be transported. Preferably, the top plate portions 26, 27, 28 can have substantially the same thickness T26, T27, T28.

Advantageously, lower ends 40 of at least a part of the one or more supporting wall portions 4 of each wing shaped portion 21, 22 form bottom surfaces to be guided by a guide track 7, especially multiple, e.g. two, elongated guides 71 of the guide track 7, in particular by a top surface 70 or a so-called guide surface 70, especially a substantially horizontally oriented top surface 70, of said a respective one of said elongated guides of a guide track. For example, bottom sides 24, 25 of the wing shaped portions 21, 22 can be formed by at least a part of the one or more supporting wall portions 4.

Contact areas of the bottom side 24, 25 of the wing shaped portions 21, 22, for contact with a top surface 70 of a guide track 7, can for instance be formed by a line pattern, e.g. a line pattern of which the lines all substantially have the same width or thickness. For example, the line pattern may comprise a comb pattern resembling a comb, may comprise multiple substantially parallel lines, may comprise lines with free outer ends, and/or may comprise maze shaped sections. For instance in such embodiments, the supporting walls may for instance be formed as ribs or walls that are branched off into multiple interconnected ribs or walls.

Alternatively or additionally, bottom surfaces of the wing shaped portions 21, 22 to be guided by a guide track 7 can be formed at least partly by a bottom surface of a bottom plate (not shown), which for instance may be interspaced from the top plate 26, 27 and can preferably be substantially parallel with said top plate. For example, supporting wall portions 4 can be formed between the bottom plate and the top plate 26, 27 by means of one or more slides of the mold used to injection mold the chain module 1. It is noted that, also in alternative embodiments, the top plate 26, 27 and/or the supporting surface 20 may be substantially parallel with the bottom surface of the wing shaped portions 21, 22 to be supported by the guide track 7.

In a preferred embodiment of the injection molded plastic chain module 1, the supporting wall portions 4 can comprise front wall sections 41a, 41b extending substantially downwards from leading edges 26a, 27a of the top plate portions 26, 27. This may for instance counteract that dirt or debris can accumulate in open spaces 45a, 45b in the wing shaped portions. Advantageously, the leading edges 26a, 27a of two respective top plate portions 26, 27 may be substantially straight and may be substantially in line with each other. Each of two front wall sections 41a, 41b extending substantially downwards from a respective one of the two leading edges 26a, 27a may preferably be substantially straight as well, and said two front wall sections 41a, 41b may be substantially in line with each other.

Additionally or alternately, the supporting wall portions 4 may comprise side wall sections 42a, 42b extending downwards from lateral outer edges 26b, 27b of the top plate portions 26, 27. Also this may for instance counteract that dirt or debris can accumulate in open spaces 45a, 45b in the wing shaped portions 21, 22.

In embodiments, the supporting wall portions 4 of a respective wing shaped portion 21, 22 can comprise wall portions 42a, 43; 41a, 44 that are interspaced with respect to each other, and which preferably may extend substantially parallel to each other. Advantageously, they are interspaced in such manner that the width W45a; W45b of an interspace 45a; 45b between two adjacent wall portions 42a, 43; 41b, 44, preferably substantially parallel wall portions 42a, 43; 41b, 44, is wider than the thickness T4: T42a, T43; T41b, T44 of each of said two wall portions 42a, 43; 41b, 44. For instance, the width W45a, W45b of the interspace 45a, 45b can be at least 120%, preferably at least 150%, more preferably at least 200%, of the thickness of the thickest of said two adjacent wall portions, which two wall portions preferably can have substantially equal thicknesses.

One or more empty spaces 45a, 45b and/or interspaces 45a, 45b, and preferably all, may be substantially elongated and/or may be substantially have a corridor like shape.

As can for instance be seen in FIGS. 2 and 5, the wing shape portions 21, 22 may be formed as substantially hollow wing shaped portions. This is, for instance more than 50%, preferably more than 60%, such as for instance at least 70%, of the total volume of the wing shaped portion may be formed by one or more empty spaces, whereas less than 50%, preferably less than 40%, such as for instance at most 30%, of the total volume of the wing shaped portion is formed by plastic material.

In preferred embodiments, the second hinge pin receiving space 32 and the third hinge pin receiving space 33 can be defined by a relatively thin cylindrically shaped wall 320, 330. It is noted that the term "relatively thin" in the context of said relatively thin cylindrically shaped wall 320, 330 may, at least in embodiments, be understood as meaning that said cylindrically shaped wall 320, 330 has a wall thickness T320, T330 that is relatively thin with respect to the outer diameter of said cylinder. For example, in embodiments, said wall thickness T320, T330 may be at most 20% of the outer diameter of said cylinder, preferably no more than 15% of said outer diameter, or even no more than 10% of said outer diameter. Additionally or alternatively, "relatively thin" in the context of said relatively thin cylindrically shaped wall 320, 330 may, at least in embodiments, be understood as meaning that said cylindrically shaped wall 320, 330 has a wall thickness T320, T330 that is relatively thin with respect to the total height of the hinge structure 3, and/or with respect to the total height of the second hinge structure portion 34 and/or the third hinge structure portion 35, which may be measured from a top side of the module and/or the supporting surface 20 of the module to the bottom end of the hinge structure 3 and/or the bottom end of the respective hinge structure portion 34, 35. Further, it is noted that, for instance in embodiments in which the cylinder is not formed as a round cylinder, but for example as an oval cylinder, the outer diameter of the respective cylinder may be understood as the cross-sectional height and/or the cross-sectional width of the cylinder and/or as the largest one thereof.

Said relatively thin cylindrically walls 320, 330 defining the second hinge pin receiving space 32 and the third hinge pin receiving space 33 can preferably have a thickness T320, T330 substantially equal to the thickness T26, T27 of the top plate portions 26, 27 and/or substantially equal to the thickness T4; T42a, T43; T41a, T44 of the supporting wall portions 4.

It is noted that said relatively thin cylindrically shaped walls 320, 330 preferably have a length, e.g. seen in their axial direction and/or in the width direction of the module 1, which length is larger than the thickness T330 of the relatively thin cylindrically shaped walls 320, 330.

Additionally or alternatively, each of the two relatively thin cylindrically shaped walls 320, 330 may be provided with at least one flange 321, 322; 331, 332, preferably at least a flange 321, 331 located at an outermost end 323, 333 of the cylindrically shaped wall 320, 330. Said one or more flanges may preferably extend substantially transverse to the axial direction of the cylindrically shaped walls 320, 330 and/or substantially in a vertical plane extending in the conveying direction. It is noted that the flange or flanges 321, 322; 331, 332 provided at the two relatively thin cylindrically shaped walls 320, 330 can have a thickness T332, T331 substantially equal to the thicknesses T330 of the relatively thin cylindrically shaped walls 320, 330, substantially equal to the thickness T26, T27 of the top plate portions 26, 27 and/or substantially equal to the thickness T4; T42a, T43; T41a, T44 of the supporting wall portions 4.

Wall portions 3321 defining lateral side surfaces 39 of the hinge structure 3 can for instance be formed by wall portions at least partly formed by outer flanges 321, 331 located at outer ends of the relatively thin cylindrically shaped walls 320, 330 and/or by wall portions formed by the second and third hinge structure portions 34, 35. Advantageously, wall portions 321 defining lateral side surfaces 39 of the hinge structure 3 can extend in a substantially vertical plane, preferably substantially in the conveying direction of the module 1. For example, such wall portions 3321 may then during use form guiding surfaces to be guided along a guide track, e.g. along side surfaces of elongated guides 71 of said guide track 7 and/or along side surfaces of an elongated slot in said guide track 7. This may for instance prevent undesired lateral movement of the modules 1 and/or the chain 6.

Further, in a direction directed to the first hinge pin receiving space 31, said preferably substantially vertically extending wall portions 3321 may turn off in an inward direction and then turn off back into a direction substantially parallel with the conveyor direction such that a first section 3321c of the wall portion 3321 located near the first hinge pin receiving space 31 is substantially parallel to a second section 3321a of said wall portion 3321 located near the second or third hinge pin receiving space 32, 33. An intermediate section 3321b of the wall portion 3321 located between the first and second sections 3321c, 3321a may be extending substantially vertical and may be curved and/or slanted with respect to said first and second sections 3321c, 3321a.

In embodiments, the first hinge pin receiving space 31 can be at least partly defined by a relatively thin wall 310, said wall 310 preferably being formed by at least part of a cylinder. It is noted that the term "relatively thin" in the context of said relatively thin wall 310 may, at least in embodiments, be understood as meaning that said wall 310, which thus may be formed by at least part of a cylinder, has a wall thickness T310 that is relatively thin with respect to the outer diameter of said cylinder. For example, in embodiments, said wall thickness T310 may be at most 20% of the outer diameter of said cylinder, preferably no more than 15% of said outer diameter, or even no more than 10% of said outer diameter. Additionally or alternatively, "relatively thin" in the context of said relatively thin wall 310 may, at least in embodiments, be understood as meaning that said wall 310 has a wall thickness T310 that is relatively thin with respect to the total height of the hinge structure 3, and/or with respect to the total height of the first hinge structure portion 31, which may be measured from a top side of the module 1 and/or the supporting surface 20 of the module 1 to the bottom end of the hinge structure 3 and/or the bottom end of said first hinge structure portion 31. Further, it is noted that, for instance in embodiments in which said cylinder is not formed as a round cylinder, bur for example as an oval cylinder (see e.g. the embodiment shown in FIG. 4), the outer diameter of the cylinder may be understood as the cross-sectional height and/or the cross-sectional width of the cylinder and/or as the largest one thereof, in particular the cross-sectional width, which may be measured in the conveying direction 65.

Additionally, said relatively thin wall 310 at least partly defining the first hinge pin receiving space 31 can have a thickness T310 substantially equal to the thicknesses T320, T330 of the relatively thin cylindrically shaped walls 320, 330 defining the second and third hinge pin receiving spaces 32, 33, substantially equal to the thicknesses T331; T332 of the flange or flanges 321, 322; 331, 332 provided at the two relatively thin cylindrically shaped walls 320, 330, substantially equal to the thickness T26, T27 of the top plate portions 26, 27 and/or substantially equal to the thickness T4; T42a, T43; T41a, T44 of the supporting wall portions 4.

In embodiments, the relatively thin wall 310 at least partly defining the first hinge pin receiving space 31 can be provided with at least one or more flanges 311, 311a, and/or rib or wall portions 311, 311a, which may extend substantially transverse with respect to the longitudinal direction of the first hinge pin receiving space 31 and/or with respect to the width direction of the module 1. It is noted that the flange or flanges 311 provided at the relatively thin wall 310 at least partly defining the first hinge pin receiving space 31 may preferably have a thickness T311a substantially equal to the thickness T310 of said relatively thin wall 310, substantially equal to the thickness T330 of the relatively thin cylindrically shaped wall 320, 330 defining the second and third hinge pin receiving spaces 32, 33, substantially equal to the thicknesses T331 of the flange or flanges 321, 322; 331, 332 provided at the two relatively thin cylindrically shaped walls 320, 330, substantially equal to the thickness T26, T27 of the top plate portions 26, 27 and/or substantially equal to the thickness T4; T42a, T43; T41a, T44 of the supporting wall portions 4.

Where the second section 3321a of the wall portion 3321 located near the second or third hinge pin receiving space 32, 33 can be formed by an outer flange 321 on the relatively thin cylindrically shaped wall 320, 330 defining the second or third hinge pin receiving space 32, 33, the first section 3321c of the wall portion 3321 located near the first hinge pin receiving space 31 can be formed by an outer flange 321 on the relatively thin wall 310 defining the first hinge pin receiving space 31.

It is noted that first wall 310 defining the first hinge pin receiving space 31 may be interconnected to the second and/or third relatively thin cylindrically shaped wall 320, 330 by more than one respective wall portion 3321. For example, a second, preferably substantially vertical wall or wall portion 3322 may be provided, which can be interspaced from said first wall portion 3321, especially in a substantially parallel manner. An inner space 38 between said interspaced wall portions 3322, 3321 may be defined by said wall portions and by an undersurface of a top plate portion 28a and outer surfaces of the respective hinge pin defining walls 310, 320, 330.

As can for instance be seen in FIG. 4, slots 29 can be provided in the top plate 26, 27, 28, 28a. The slots 29 can counteract accumulation of plastic material, e.g. when parts of the hinge structure 3 interconnecting a hinge pin receiving part at a front side of the module with a hinge pin receiving part at a rear side of the module have a width substantially larger than a wall thickness of the module. Said slots 29 can for instance for interspaces between ribs and/or flanges 321, 322; 311a, 311c provided on a respective relatively thin wall 310, 320, 330 defining a hinge pin receiving space.

Furthermore, in preferred embodiments, the wing shaped portion, or even the complete injection molded plastic chain module 1, can substantially consist of a plurality of relatively thin plate and/or wall portions 26, 27, 28, 4, 41, 42, 43, 44, 310, 311, 320, 321, 322, 330, 331, 332. For example, all of said relatively thin wall or plate portions can all have a thickness T26, T27, T4, T42, T42a, T43, T331, T332 between 0.5 and 4 mm, preferably between 1.5 mm and 2.5 mm, such as for instance about 1.5, 1.8, 2.0, or 2.5 mm.

Figure 6:
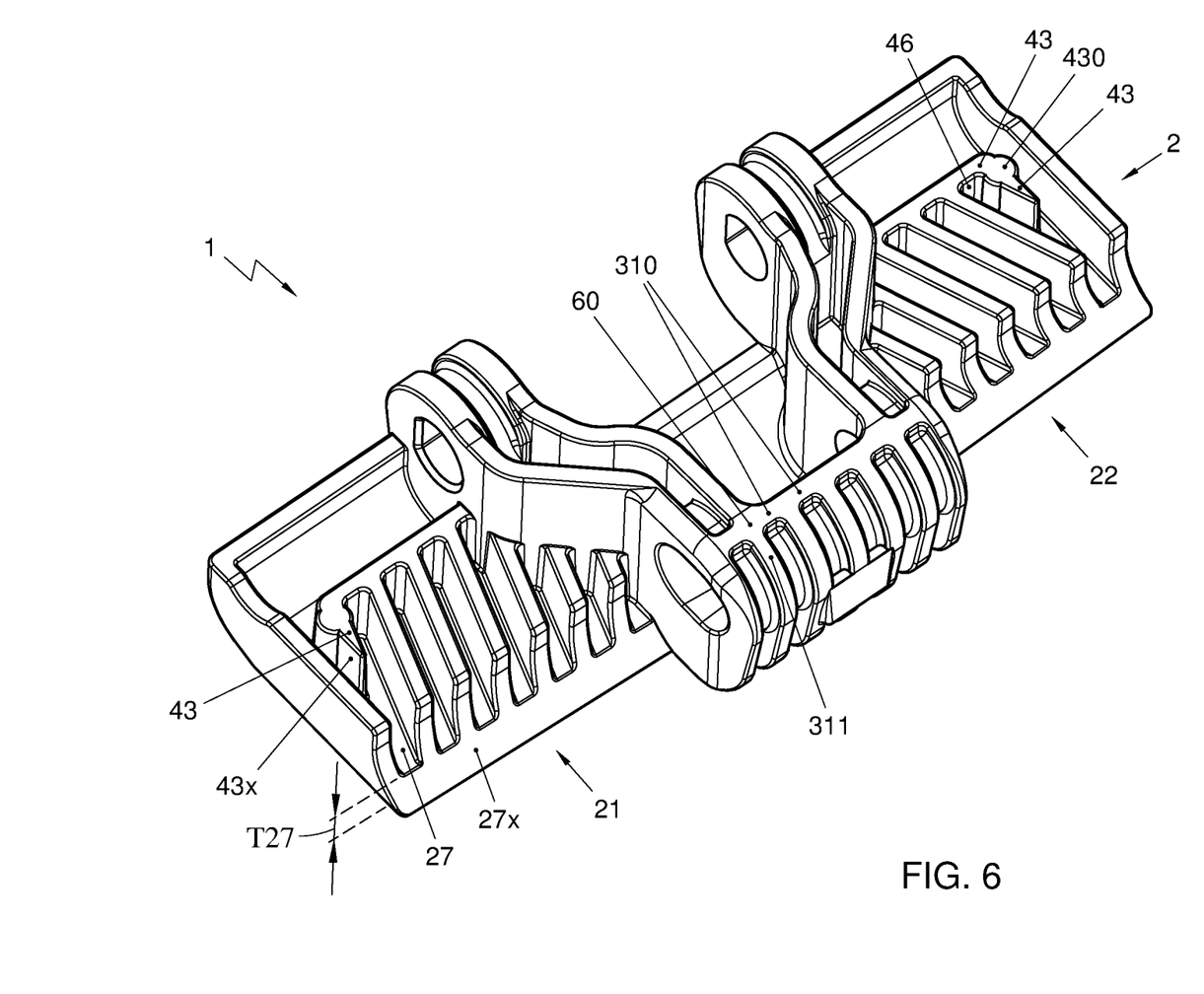
FIG. 6 shows a schematic perspective view of a bottom side of an alternative embodiment of a conveyor system according to an aspect of the invention.

It will be clear to one skilled in the art that even when the wing shaped portion 21, 22, or another part of the module 1 such as for instance the hinge structure 3, comprises one or more thickenings 430, such as for instance is the case in the exemplary embodiment shown in FIG. 6, the wing shaped portion 21, 22, and preferably the whole module 1, may still be considered as substantially consisting of a plurality of relatively thin plate and/or wall portions, especially in embodiments in which the thickening 430 can be considered as an intersection of two intersecting plate and/or wall portions. For example, in the embodiment of FIG. 6, the thickening 430 can be considered as an intersection at which a first plate and/or wall portion 43 intersects with a substantially transverse plate and/or wall portion, wherein said transverse plate and/or wall portion is relatively short and has rounded off distal ends, as a result of which said intersecting plate and/or wall portions can substantially resemble a thickening 430 and/or a post like structure 430. Preferably, such the thickness or diameter of such thickening 430 and/or a post like structure 430 should not substantially exceed the thickness or diameter of other intersections 60 between intersecting plate and/or wall portions 311, 310.

Additionally or alternatively, all relatively thin wall or plate portions can preferably have a substantially equal thickness. As noted before, "having substantially the same thickness" and/or "having a substantially equal thickness" may at least be considered as meaning that the thickness of the plate and/or wall portions differ from each other to such a small extent that the thickness of the thickest plate or wall portion is at most 250%, preferably at most 200% or at most 150%, more preferably less than 120%, even more preferably less than 115%, such as for instance at most 110% or 105%, of the thickness of the thinnest plate and/or wall portion. It is noted that one or more plate or wall portions can be rounded off and/or tapered such as for instance can be seen in FIG. 6, and that it will be clear to one skilled in the art that the thickness of a plate and/or wall portion 27, 43 should not be measured at a narrowed section 27x, 43x, e.g. a tapered end section 27x, 43x of said plate and/or wall portion 27, 43. For example, the tapered end section 27x of the top plate portion 27 of the wing shaped portions 21 should be disregarded when determining the thickness T27 of said top plate portion 27. Additionally, local thickenings 60, 430, especially when they can be considered as intersections between plate and/or wall portions, should also be disregarded when determining the thickness of a respective plate and/or wall portion 40, 310, 311.

Alternatively or additionally, "having substantially the same thickness" and/or "having a substantially equal thickness" may be considered as meaning that the diameter of the largest virtual sphere that can be completely enclosed within the plastic material forming the chain module 1 can be at most 300%, preferably at most 250%, more preferably at most 220%, such as for instance about 200%, of the diameter of the largest virtual sphere that can be enclosed within the plastic material at the thinnest wall portion section that is not tapered. The largest virtual sphere or spheres that at a certain position can be completely enclosed within the tapered end sections 27x, 43x of plate and/or wall portions 27, 43 of the module 1 should then thus be disregarded for determining the diameter of the largest virtual sphere that can be enclosed within the plastic material at the thinnest wall portion section of the chain module 1.

It is noted that for the purpose of clarity and a concise description features are described herein as part of the same or separate embodiments, however, it will be appreciated that the scope of the invention may include embodiments having combinations of all or some of the features described.

Further, it is noted that the invention is not restricted to the embodiments described herein. It will be understood that many variants are possible.

Such variants will be apparent for the person skilled in the art and are considered to lie within in the scope of the invention as formulated in the following claims.

The invention claimed is:

1. An injection molded plastic chain module for a modular conveyor chain, comprising a substantially elongate conveying body defining a supporting surface for supporting products to be transported on said conveying body, and a hinge structure for hingedly connecting the plastic chain module with other modules, wherein the hinge structure is located at a lower side of the plastic chain module, wherein the hinge structure comprises a first hinge structure portion, especially a hinge structure rear portion located at the trailing side of the module, which first hinge structure portion defines a first hinge pin receiving space for receiving a hinge pin, wherein the hinge structure further comprises a second hinge structure portion and a third hinge structure portion, especially two hinge structure front portions located at the leading side of the module, wherein said second and third hinge structure portions define a second hinge pin receiving space and a third hinge pin receiving space, respectively, wherein said second and third hinge structure portions are interspaced to receive a first hinge structure portion, especially a hinge structure rear portion, of a consecutive chain module there between, wherein the substantially elongate conveying body comprises a central portion, wherein the substantially elongate conveying body further comprises two wing shaped portions substantially extending away from said central portion in a respective lateral direction, wherein bottom sides of said wing shaped portions are arranged to be supported by a guide track, wherein each of both wing shaped portions comprises a respective top plate portion defining a part of the supporting surface for supporting products to be transported, each of said top plate portions having a thickness being less than ⅓ of the thickness of the respective wing shaped portion, and in that each wing shaped portion further comprises one or more supporting wall portions for supporting the respective top plate portion, wherein the supporting wall portions extend substantially downwards from the respective top plate portion, wherein the first hinge pin receiving space is at least partly defined by a relatively thin wall, and wherein flanges and/or rib or wall portions are provided on said relatively thin wall.

2. The injection molded plastic chain module according to claim 1, wherein lower ends of at least a part of the one or more supporting wall portions of each wing shaped portion form bottom surfaces to be guided by a guide track, especially by respective ones of elongated guides of a guide track.

3. The injection molded plastic chain module according to claim 1, wherein the supporting wall portions comprise front wall sections extending substantially downwards from leading edges of the top plate portions.

4. The injection molded plastic chain module according to claim 1, wherein the supporting wall portions comprise side wall sections extending downwards from lateral outer edges of the top plate portions.

5. The injection molded plastic chain module according to claim 1, wherein the supporting wall portions of a respective wing shaped portion comprise multiple wall portions that are interspaced with respect to each other such that an interspace between two adjacent wall portions is wider than the thickness of each of said two wall portions.

6. The injection molded plastic chain module according to claim 1, wherein the wing shape portions are formed as substantially hollow wing shaped portions.

7. The injection molded plastic chain module according to claim 1, wherein the second hinge pin receiving space and the third hinge pin receiving space are defined by a relatively thin cylindrically shaped wall.

8. The injection molded plastic chain module according to claim 7, wherein each of the two relatively thin cylindrically shaped walls is provided with at least one flange.

9. The injection molded plastic chain module according to claim 1, wherein the flanges and/or rib or wall portions, which are provided on the relatively thin wall at least partly defining the first hinge pin receiving space, extend substantially transverse with respect to the longitudinal direction of the first hinge pin receiving space and/or with respect to the width direction of the module.

10. The injection molded plastic chain module according to claim 1, wherein the module substantially consists of a plurality of relatively thin plate and/or wall portions.

11. A modular conveyor chain, comprising a plurality of injection molded plastic chain modules according to claim 1.

12. A conveyor system, comprising a modular conveyor chain according to claim 11.

13. The conveyor system according to claim 12, further comprising track means.

14. The injection molded plastic module according to claim 5, wherein the multiple wall portions are substantially parallel.

15. The injection molded plastic module according to claim 8, wherein at least the at least one flange is located at an outermost end of the cylindrically shaped wall.

16. The injection molded plastic module according to claim 1, wherein said relatively thin wall is formed by at least part of a cylinder.

17. The injection molded plastic module according to claim 10, wherein the plurality of relatively thin plate and/or wall portions all have a substantially equal thickness.

18. The injection molded plastic module according to claim 17, wherein the thickness of the thickest plate or wall portion is at most about 250% of the thickness of the thinnest plate or wall portion.

19. The conveyor system according to claim 13, wherein the track means comprises a guide track comprising two elongated guides, wherein bottom sides of the wing shaped portions of modules of a top run of the conveyor chain are guided by a respective one of two elongated guides of a guide track during use of the conveyor.

* * * * *